United States Patent [19]
Wass

[11] Patent Number: 5,647,390
[45] Date of Patent: Jul. 15, 1997

[54] THERMAL RELIEF VALVE WITH IMPROVED BAYONET

[76] Inventor: Lloyd G. Wass, 1640 Blackhawk Cove, Eagan, Minn. 55122

[21] Appl. No.: 411,945

[22] Filed: Mar. 28, 1995

[51] Int. Cl.[6] ............................................. F16K 17/40
[52] U.S. Cl. ................ 137/68.12; 137/68.3; 137/72; 137/79; 222/5; 222/54; 222/81
[58] Field of Search .................... 137/68.12, 68.22, 137/68.3, 72, 73, 79, 68.29; 222/5, 54, 81

[56] References Cited

U.S. PATENT DOCUMENTS

| | | | |
|---|---|---|---|
| 2,230,323 | 2/1941 | Guyton | 277/67 |
| 3,001,536 | 9/1961 | Casey | 137/68 |
| 3,008,479 | 11/1961 | Mancusi, Jr. | 137/68 |
| 3,010,520 | 11/1961 | Seaberg | 169/31 |
| 3,101,188 | 8/1963 | Newmiller et al. | 137/68.3 X |
| 3,101,733 | 8/1963 | Lord | 137/68.3 X |
| 3,255,824 | 6/1966 | Rodgers | 222/5 X |
| 3,263,929 | 8/1966 | Seablom | 239/204 |
| 3,491,783 | 1/1970 | Linsalato | 137/68.3 X |
| 3,618,627 | 11/1971 | Wagner | 137/73 |
| 3,633,596 | 1/1972 | Gerber | 137/68 |
| 3,730,204 | 5/1973 | Bissett | 137/68 |
| 3,791,450 | 2/1974 | Poitras | 169/37 |
| 3,811,457 | 5/1974 | Crossman | 137/73 |
| 3,842,853 | 10/1974 | Kelly et al. | 137/75 |
| 3,896,835 | 7/1975 | Wicke | 137/75 |
| 3,906,976 | 9/1975 | Nohr et al. | 137/68 |
| 4,006,780 | 2/1977 | Zehr | 169/26 |
| 4,064,890 | 12/1977 | Collins et al. | 137/73 |
| 4,083,187 | 4/1978 | Nagashima | 60/407 |
| 4,195,745 | 4/1980 | Roberts et al. | 220/2.2 |
| 4,197,966 | 4/1980 | Wadensten et al. | 222/1 |
| 4,221,231 | 9/1980 | Harvey et al. | 137/72 |
| 4,228,858 | 10/1980 | Sclafani | 169/41 |
| 4,352,365 | 10/1982 | Bocardo et al. | 137/68 R |
| 4,430,392 | 2/1984 | Kelley et al. | 429/53 |
| 4,431,716 | 2/1984 | Eppley et al. | 429/53 |
| 4,609,005 | 9/1986 | Upchurch | 137/68.1 |
| 4,744,382 | 5/1988 | Visnic et al. | 137/68.1 |
| 4,750,510 | 6/1988 | Short, III | 137/1 |
| 4,896,690 | 1/1990 | Taylor | 137/73 |
| 4,922,944 | 5/1990 | Mueller et al. | 137/72 |
| 5,048,554 | 9/1991 | Kremer | 137/69 |
| 5,161,738 | 11/1992 | Wass | 137/68.29 X |
| 5,213,128 | 5/1993 | Baird | 137/73 |

FOREIGN PATENT DOCUMENTS 922433  4/1963  United Kingdom.

*Primary Examiner*—John Rivell
*Attorney, Agent, or Firm*—Kinney & Lange, P.A.

[57] ABSTRACT

A thermally activated relief valve is used with a compressed gas storage cylinder. A valve body has a passage for communication with the interior of the cylinder. A metal disc sealing the passage has a first side exposed to the interior of the cylinder and a second side opposite the first side. A cutting end of a movable hollow bayonet is positioned in the passage of the valve body adjacent to the second side of the metal disc. A spring biases the bayonet toward the metal disc. A thermal trigger is operably coupled to the bayonet for holding the bayonet in spaced relation to the metal disc until the thermal trigger reaches a predetermined temperature threshold. Upon reaching the predetermined temperature threshold, the thermal trigger releases the bayonet thereby allowing the cutting end of the hollow bayonet to move toward the metal disc under force exerted by the spring to pierce the metal disc and thereby expose a flow path through the hollow bayonet. A portion of a wall of the bayonet, adjacent to the cutting end, is removed to prevent any potential remaining flap of the metal disc from wedging inside the hollow bayonet and blocking the flow path through the hollow bayonet.

4 Claims, 3 Drawing Sheets

THERMAL RELIEF VALVE WITH IMPROVED BAYONET

REFERENCE TO COPENDING APPLICATIONS

Reference is made to copending U.S. patent application Ser. No. 08/411,493, entitled TEMPERATURE RELIEF VALVE WITH THERMAL TRIGGER by Lloyd G. Wass and Kurt L. Drewelow, filed concurrently herewith.

BACKGROUND OF THE INVENTION

The present invention relates to a relief valve. More particularly, the present invention relates to a thermally activated relief valve for use with a compressed gas storage cylinder (or pressure vessel).

It is desirable for some compressed gas storage cylinders to have safety valves such as a thermal relief device (TRD). For example, cylinders which hold compressed natural gas are required by law to have such relief valves.

In the past, such cylinders have used thermal relief valves which are activated when the body of the thermal relief valve exceeds a temperature threshold. For example, thermal relief valves of the prior art would typically have a passage which communicated with the interior of the cylinder. However, the passage would be filled (blocked) with a eutectic metal slug which remained solid below the predetermined melting temperature of the eutectic. Then, if the temperature of eutectic substance raised above the predetermined melting temperature, the slug would soften or melt. In its softened or weakened state, the eutectic substance would be forced out of the passage in the relief valve by the pressure of the gas in the cylinder. With the eutectic substance removed from the passage, the gas would be released through the passage to the external atmosphere or another suitable container.

However, such a relief valve was plagued by certain problems. The problems primarily resulted because the eutectic metal was exposed to the gas pressure in the cylinder. Under such pressure, the eutectic substance underwent what is known as plastic flow or creep. In other words, the gas pressure acting on the eutectic block over time would push some of the eutectic block out of the passage. Thus, even though no over-temperature condition existed, the thermal relief valve would be partially activated and leak. Since the eutectic substance, exposed to the gas pressure, was prone to plastic flow or creep, the life expectancy of such a thermal relief valve was relatively short. Thus, such relief valves need to be replaced more often than desirable.

Combination pressure relief and thermal relief devices have typically used a eutectic metal "slug" backed by a thin metal disc. Although this design solves the eutectic creep problem, it obviously requires a minimum gas pressure to rupture the disc, and has thus proven to be inoperative on partially filled cylinders. A letter warning against the use of this type of relief device was circulated by the United States and Canadian Gas Associations several years ago.

Since the eutectic creep problem is diminished with the use of smaller and/or partially restricted bores/openings, one solution is to simply limit the physical size of the TRD. While this is a perfectly practical solution for small volume cylinders, it is totally impractical for cylinders used on large trucks or buses. A recent CNG Urban Bus demonstration project utilizing three (3) long storage cylinders mounted on the bus roof required a total of twenty-seven (27) TRDs to meet the required emergency flow rate.

The advance of high pressure composite technology has made it feasible and economically attractive to expand the size and pressure capabilities of storage cylinders for compressed natural gas used in vehicular applications. These new design, light weight, composite cylinders are typically constructed using a thin wall metal or plastic liner which is over-wrapped with multiple layers of fiberglass/epoxy resin or graphite fiber/epoxy resin. In either case, the majority of the cylinders' burst strength is provided by the fiberglass or graphite/resin over-wrap. Because the over-wrap material is more susceptible to damage in a fire than metal, this cylinder design is more vulnerable to fire than conventional all-metal storage cylinders.

To adequately protect these "space age" cylinders from wrap strength degradation in a fire, the cylinders must be protected/fitted with high flow, fast acting, thermal relief safety devices. It should be noted that older style thermal devices (either open throat or convoluted/mazed) do not function (activate) consistently in these applications because the relatively cold stored gas inside the "insulated" cylinder cools the flow blocking eutectic mix as the gas begins to exit. This causes the eutectic to "re-freeze" and block the gas exit path. In this scenario, the fire causes the outer wall temperature of the cylinder to continue to escalate, while the eutectic safety device goes through a succession of freeze/thaw (melt) cycles during which time (typically 8–12 minutes) very limited amounts of compressed gas are released. This situation leaves the cylinder very vulnerable to catastrophic failure because of the cylinders' reduced burst strength.

As disclosed in U.S. Pat. No. 5,161,738, a relief valve utilizing a hollow bayonet to puncture a metal disc seal is known in the art. The bayonet design disclosed therein functions effectively to pierce the metal disc when it has a thickness no greater than 0.005 inch. At high operating pressures, the portion of the metal disc that is cut by the prior bayonet design is completely exhausted ("digested") out of the relief valve. At operating pressures of about 500 p.s.i. or less, or when the metal disc has a thickness greater than 0.005 inch, the prior bayonet design has been found to be incapable of consistently and dependably "digesting" the metal disc. As such, the portion of the metal disc that is cut by the prior bayonet design has a tendency to become lodged in the hollow bayonet, thereby preventing an unobstructed flow of gas through the relief valve.

At a thickness of 0.005 inch, the metal disc forming the seal has an over-pressure burst value of approximately 5400 p.s.i. Recent rule changes in filling procedures for storage cylinders used in compressed natural gas-operated vehicles allow 125% over-filling of such storage cylinders. Thus, storage cylinders having a working pressure of 3600 p.s.i. are now permitted to be filled to 4500 p.s.i. (125%×3600 p.s.i.). In light of this recent change, it has become necessary to use thicker metal disc seals to avoid incursion into the upper 30% of the disc pressure range (where cycle fatigue is likely to occur). A metal disc having a thickness of about 0.007 inch has a burst value of about 7500 p.s.i. The ability to use a metal disc seal having a thickness of 0.007 inch in a hollow bayonet-type relief valve would provide about a 2000 p.s.i. margin over the previous industry guideline limit of 150% of working pressure (which is 5400 p.s.i. for a 3600 p.s.i. system). This in turn would provide considerable stability and reliability to the relief valve.

There is, therefore, a need for a relief valve which meets or exceeds all of the critical performance criteria necessary for the newer cylinder designs, as well as for the filling procedures for CNG automobile storage cylinders. Such a relief valve must satisfy the following conditions:

(1) Fast Action—Typical fire activation time of 2–3 minutes is needed to allow compressed gas to begin venting before the over-wrapped cylinder's burst strength is significantly reduced.

(2) Very High Reliability—The design must have the following features to assure high reliability:

(a) The relatively cool exiting gas stream can not resolidify the eutectic to possibly cause a catastrophic failure due to delayed activation.

(b) Cylinder gas pressure can not exert an "extruding" force on the eutectic when the eutectic becomes susceptible to "plastic flow" (creep) as the system temperature approaches/encroaches on the eutectic melt temperature (during routine operation).

(c) The bayonet design must be capable of consistently and dependably rupturing the metal disc seal to expose a flow path for the contents of the storage cylinder.

(3) Relatively High Flow—The relief valve must open a relatively large exhaust port to achieve high flow (exhaust) rates.

SUMMARY OF THE INVENTION

The relief valve of the present invention includes a valve housing, which is connectable to a pressurized system. The valve housing has a passage with an inlet for communication with an interior of the pressurized system, and an outlet. A metal disc is disposed within the passage between the inlet and the outlet thereby forming a seal of the passage. For thermal activation, a spring-biased hollow bayonet is mounted within the passage between the metal disc and the outlet and is movable between a first position and a second position. The hollow bayonet includes a bayonet tube which has a tubular wall and a cutting end. The cutting end comprises a leading edge and a trailing edge. The tubular wall of the bayonet tube is formed to provide an opening adjacent to the leading edge of the cutting end. The opening is generally vertically aligned with the trailing edge.

In the first position, the cutting end of the bayonet tube is spaced from the metal disc, and in the second position, the cutting end of the bayonet tube pierces the metal disc to expose a flow path. A thermally activated restraining member holds the bayonet in the first position with the cutting end of the bayonet tube spaced relative to the metal disc when ambient temperature is below a predetermined temperature threshold. The themally activated restraining member releases the bayonet when ambient temperature reaches the predetermined temperature threshold, thereby allowing the bayonet to move from the first position to the second position when the thermal trigger reaches the predetermined temperature threshold.

DETAILED DESCRIPTION OF THE PREFERRED EMBODIMENTS

Figure 1:
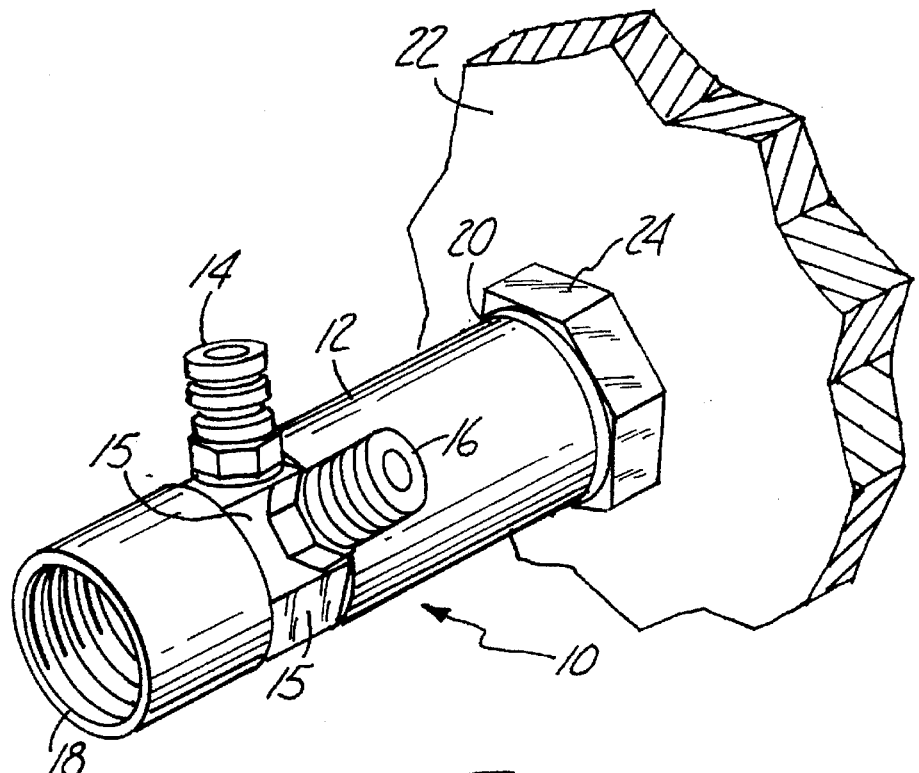
FIG. 1 is an enlarged perspective view of the relief valve of the present invention.

As shown in FIG. 1, relief valve 10 generally comprises valve body 12, thermal triggers 14 and 16, outlet end 18 and inlet end 20. By way of example, inlet end 20 of valve body 12 is connected to pressure vessel 22 (shown in fragment) by way of coupler 24. As is well known in the art, valve 10 can be connected to a control valve (not shown) of pressure vessel 22, or in any manner that exposes inlet end 20 to an interior of a pressurized system.

Valve body 12 is provided with circumferential wrench flats 15 to allow valve body 12 to be torqued into engagement with coupler 24. Since the environment in which valve body 12 is located is usually somewhat restrictive, thermal triggers 14 and 16 are situated on adjacent wrench flats 15.

Figure 2A:
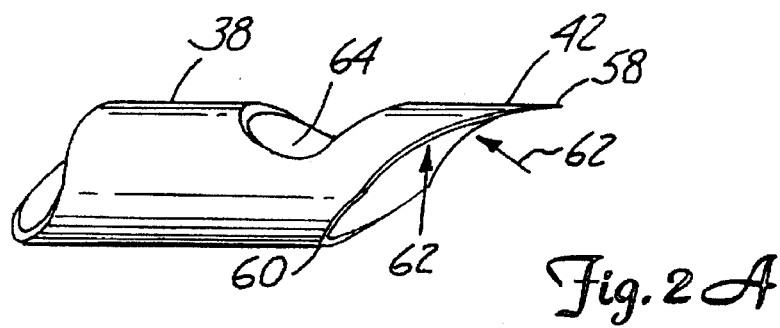
FIGS. 2A is an enlarged partial perspective view of the bayonet of the relief valve of FIG. 2.
Figure 2B:
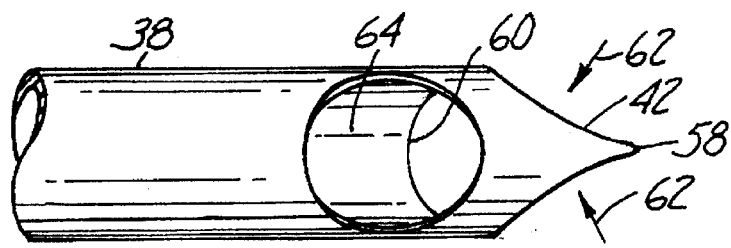
FIG. 2B is an enlarged top view of the bayonet of FIGS. 2 and 2A.
Figure 2:
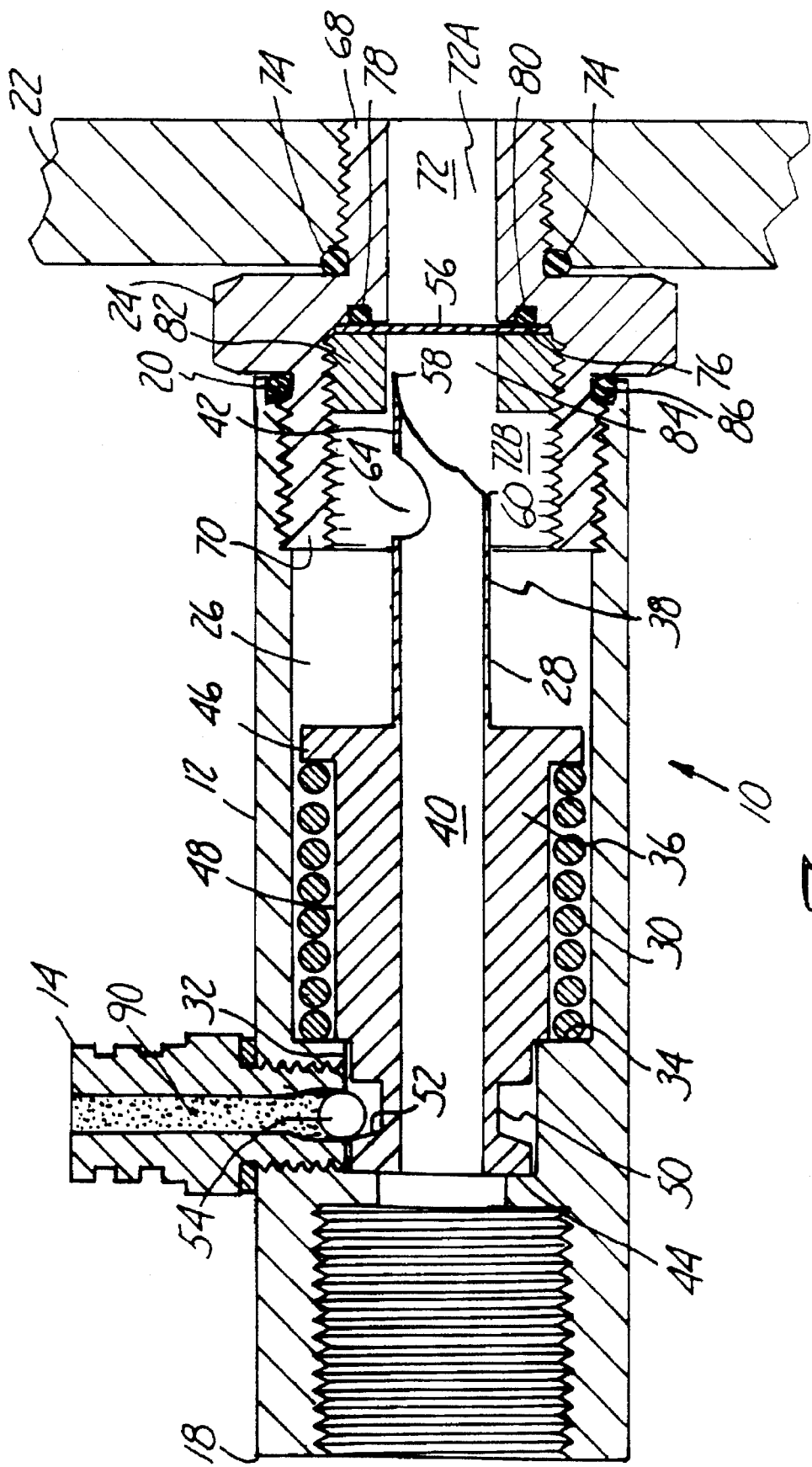
FIG. 2 is a cross-sectional view of the relief valve of the present invention.

FIG. 2 is a cross-sectional view of relief valve 10 of the present invention. As shown in FIG. 2, valve body 12 includes bore 26, which extends from inlet end 20 to outlet end 18. Bore 26 of valve body 12 houses hollow bayonet 28 and spring 30, and provides a flow path for the controlled release of compressed gas from pressure vessel 22 in the event ambient temperatures exceed a predetermined temperature threshold. Bore 26 is provided with internal threads at inlet end 20 for mating with external threads of coupler 24. Bore 26 is also provided with internal threads near outlet end 18 to permit connection of any variety of accessories to outlet end 18, such as pipes, diffusers, etc. Bore 26 has an inner diameter which is stepped down at region 32 to form radial shoulder 34. Radial shoulder 34 provides a surface against which spring 30 can contact to allow spring 30 to be compressed when relief valve 10 is in a "loaded" condition.

As further shown in FIG. 2, bayonet 28 includes bayonet body 36, bayonet tube 38 and passage 40, which extends from piercing tip 42 to body end 44. Bayonet body 36 has a maximum outer diameter which is slightly less than the inner diameter of bore 26 of valve body 12, and a minimum outer diameter which is slightly less than the inner diameter of bore 26 at region 32. Bayonet body 36 is therefor capable of moving freely within bore 26 between a first "loaded" position, as shown in FIG. 2, and a second position which exposes a flow path for the compressed gas, as will be discussed below in more detail.

Bayonet body 36 is machined to create radial shoulder 46, body region 48 and circumferential notch 50. Radial shoulder 46 provides a surface which opposes radial shoulder 34 of region 32 of bore 26 so as to capture spring 30 therebetween. Body region 48 has an outer diameter that is less than that of radial shoulder 46 so as to provide the necessary space to house spring 30. Circumferential notch 50 has a width and depth sufficient to allow detents 54 of thermal triggers 14 and 16 to fit partially therein. Circumferential notch 50 includes circumferential ramped surface 52. In the "loaded" position shown in FIG. 2, detents 54 of thermal triggers 14 and 16 (which are held in position by a metal eutectic) rest against circumferential ramped surface 54 of circumferential notch 50 to restrain bayonet 28 in the first "loaded" position, with spring 30 compressed between radial shoulder 34 of valve body 12 and radial shoulder 46 of bayonet body 36.

Bayonet tube 38 extends from radial shoulder 46 and has a length which, when combined with the length of bayonet body 36, positions piercing tip 42 adjacent to puncture disc 56, when bayonet 28 is in the "loaded" position. Bayonet tube 38 has a relatively thin circumferential wall. As can be seen in FIGS. 2, 2A and 2B, piercing tip 42 of bayonet tube 38 is formed at an angle so as to form leading edge 58 and trailing edge 60. As shown in FIG. 2B, in one preferred embodiment, leading edge 58 of piercing tip 42 is thereafter sharpened by electrical discharge machining (EDM) of the circumferential wall of bayonet tube 38 in the direction indicated by arrows 62 so as to produce a fountain pen-like point to leading edge 58. In an alternative preferred embodiment, as generally demonstrated in FIG. 2A, the circumferential wall of bayonet tube 38 is also machined by EDM at an upward angle (as oriented in FIG. 2A) of approximately 30 degrees relative to a longitudinal axis of bayonet tube 38. In this manner, leading edge 58 is provided with a razor-like edge which, in combination with the fountain pen-like point of leading edge 58, produces a highly efficient cuffing surface.

As is further seen in FIGS. 2, 2A and 2B, bayonet tube 38 is provided with an opening in the upper portion of the circumferential wall of bayonet tube 38 (as oriented in FIG. 2A). Opening 64 is formed by grinding or cutting (e.g. by EDM). Opening 64 is located adjacent to leading edge 58 such that opening 64 is generally vertically aligned with trailing edge 60 of piercing tip 42. Opening 64 preferably is dimensioned approximately equal to the inner diameter of bayonet tube 38.

As previously disclosed, valve body 12 is connected to pressure vessel 22 by coupler 24. Coupler 24 includes an inlet end 68, an outlet end 70 and a cavity 72 therebetween. Inlet end 68 is provided with external threads which permits coupler 24 to be threaded into internal threads of pressure vessel 22. O-ring 74 is provided between coupler 24 and pressure vessel 22 to provide a fluid-tight seal when coupler 24 is connected to pressure vessel 22.

Cavity 72 of coupler 24 defines radial shoulder 76 at the transition of narrow region 72A and a wide region 72B. Radial shoulder 76 includes a circular groove 78 which provides a location for O-ring 80. Wide region 72B is provided with internal threads which permit retainer 82, which includes external threads, to be threaded into wide region 72B of cavity 72 to retain puncture disc 56 against radial shoulder 76 and O-ring 80 and thereby form a seal across cavity 72. In the preferred embodiment, puncture disc 56 comprises a corrosion resistant metal such as stainless steal, INCONEL® or MONEL®. Puncture disc 56 has a thickness of between about 0.005 inch to about 0.007 inch. Retainer 82 includes bore 84 which is dimensioned approximately equal to cavity 72 of coupler 24 and is coaxially aligned with cavity 72 and passage 40 of bayonet 28. Likewise, bayonet tube 38 of bayonet 28 has an outer diameter which is slightly smaller than the inner diameters of bore 84 and cavity 72 so as to allow bayonet 28 to move to the second position.

As further shown in FIG. 2, outlet end 70 of coupler 24 is provided with external threads which allows valve body 12 to be threadably connected to coupler 24. O-ring 86 is provided between valve body 12 and coupler 24 to ensure a fluid-tight connection. When valve body 12 is assembled in the "loaded" position, as shown in FIG. 2, leading edge 58 of piercing tip 42 of bayonet tube 38 is positioned adjacent to puncture disc 56.

In the event the temperature surrounding relief valve 10 exceeds a predetermined temperature threshold, the metal eutectic holding detents 54 in engagement with circumferential notch 50 melts. Under the load of spring 30, bayonet 28 is then urged toward puncture disc 56, with ramped surface 52 of circumferential notch forcing detents 54 into cavities 90 of thermal triggers 14 and 16. Thereafter, bayonet 28 continues to be urged toward puncture disc 56 (i.e., toward the second position) under the load of spring 30 until piercing tip 42 of bayonet tube 38 pierces puncture disc 56 to expose a flow path from an interior of pressure vessel 22 through cavity 72, bore 84, passage 40 and ultimately to bore 26 at outlet end 18 of valve body 12. This operation is more completely described in U.S. Pat. No. 5,161,738 and accordingly the disclosure of U.S. Pat. No. 5,161,738 is incorporated herein by reference.

The unique design of bayonet 28 of relief valve 10 is particularly adapted to provide a dependable controllable release of gas from a storage cylinder used in compressed natural gas (CNG) vehicle applications. In particular, bayonet 28 of the present invention permits the use of a puncture disc with a thickness greater than 0.005 inch up to and including about 0.007 inch. In addition, bayonet 28 of the present ensures dependable relief operation when the pressure with the pressure vessel is relatively low (e.g., below approximately 500 p.s.i.).

Figure 3:
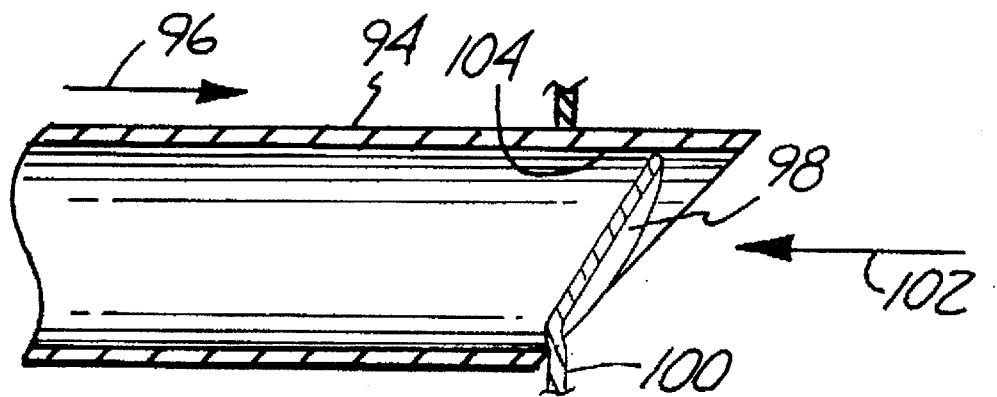
FIG. 3 is an enlarged partial cross-sectional view of a conventional bayonet.

As shown in FIG. 3, if a puncture disc having a thickness of 0.005 inch or more is punctured by a conventional bayonet 94 (moving in the direction indicated by arrow 96) and when the pressure in the pressure vessel is relatively low, a flap 98 of puncture disc 100, which has been partially cut out by bayonet 94, may fail to be "digested" or completely expelled. Rather, the flow of compressed gas (moving in the direction indicated by arrow 102) tends to cause the flap 98 to curl and become lodged against the upper inner surface 104 of bayonet 94, thereby preventing the contents of the pressure vessel from being adequately exhausted through the relief valve. This same result may also occur if the thickness of the puncture disc is greater than 0.005 inch and the pressure in the pressure vessel is greater than about 500 p.s.i.

Figure 4:
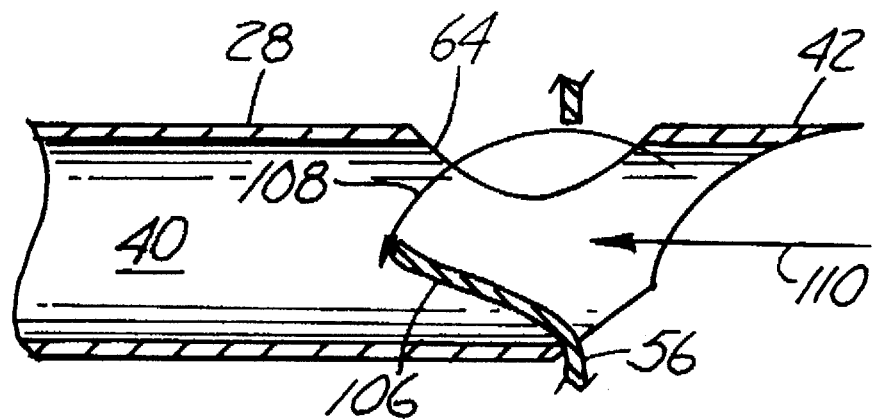
FIG. 4 is an enlarged partial cross-sectional view of the bayonet of the present invention.

FIG. 4 is an enlarged partial cross-sectional view of bayonet 28 of the present invention, which demonstrates the manner in which the present invention overcomes the limitations of the prior art. As shown in FIG. 4, as puncture disc 56 is punctured by piercing tip 42, opening 64 of bayonet 28 allows flap 106 of puncture disc 56 to rotate in an arc (represented by curved arrow 108) due to the flow of compressed gas (represented by arrow 110). Under pressure, flap 106 is forced against the inner surface of bayonet 28 thereby allowing the contents of pressure vessel 22 to be expelled. To ensure that puncture disc 56 is efficiently punctured by bayonet 28, bayonet 28 is provided with a uniquely sharpened leading edge 58, as previously disclosed.

Bayonet tube 38 of bayonet 28 has an outer diameter which is slightly smaller than the inner diameteters of bore 84 and cavity 72. Upon puncture of the disc 56, substantially all of the disc 56e that is in the flow path is digested or otherwise taken into the bayonet tube 28 past the opening 64, leaving a substantially unimpeded flow path through the bayonet tube 28 as shown in FIG. 4. The portion of the disc 56 that is outside the flow path and between retainer 82 and radial shoulder 76 is retained in place and not digested or otherwise taken into bayonet tube 28. In addition, spring 30 preferably exerts a force of about 50 pounds or more on bayonet 28 to ensure that puncture disc 56 is efficiently pierced when puncture disc 56 has a thickness greater than 0.005 inch. In one preferred embodiment, spring 30 exerts a force of about 70 pounds on bayonet 28.

It is preferable to minimize the spring force on the thermal trigger. As the spring force on the thermal trigger increases, the potential exists for an undesirable gradual eutectic flow at temperatures below the predetermined temperature threshold. This in turn increases the potential for a premature release of the bayonet and the consequential premature discharge of the contents of the pressure vessel. To address this concern, relief valve 12 is provided with multiple thermal triggers 14 and 16. By utilizing multiple thermal triggers 14 and 16, the spring force of spring 30 is divided therebetween. Accordingly, the risk of the undesirable eutectic creep is essentially eliminated, which allows relief valve 10 to be exposed to temperatures closer to the eutectic melt temperature without a premature release of the bayonet.

As stated earlier, relief valve 10 of the present invention is ideally suited for vehicular systems applications. In preferred embodiments, relief valve 10 of the present invention is used in combination with a crash proof solenoid controlled valve described in U.S. Pat. No. 5,197,710, which description is incorporated herein by reference. In one preferred embodiment, relief valve 10 and the solenoid controlled valve are mounted at opposite ends of the pressure vessel or at the same end, depending upon the particular application. In an alternative embodiment, relief valve 10 is mounted in the valve body of the solenoid controlled valve.

Although the present invention has been described with reference to preferred embodiments, workers skilled in the art will recognize that changes may be made in form and detail without departing from the spirit and scope of the invention.

What is claimed is:

1. In a thermally activated relief valve having a valve housing which has an inlet end for connection to a pressure source, an outlet end and a passageway extending therebetween; a metal disc seal within the passageway adjacent to the inlet end; a movable hollow bayonet within the passageway adjacent to the seal; bias means for biasing the bayonet towards the seal; and a thermally activated restraining member operably connected to the bayonet to hold the bayonet in a first position with the bayonet spaced relative to the seal when ambient temperature is below a predetermined threshold and to release the bayonet when ambient temperature reaches the predetermined temperature threshold to allow the bayonet to puncture the seal and thereby expose a flow path, the improvement comprising:

a hollow bayonet tube having a tubular wall, a cutting end comprising a leading edge and a trailing edge, an opposite end and the flow path therebetween, the tubular wall being configured to define an opening adjacent to the leading edge, wherein the opening is generally vertically aligned with the trailing edge, the cutting end of the bayonet tube being sized relative to the passageway adjacent to the inlet end such that, upon puncture of the seal, the bayonet tube takes in substantially all of the seal in the flow path past the opening.

2. The relief valve of claim 1, wherein the metal disc seal has a thickness greater than 0.005 inch.

3. The relief valve of claim 2, wherein the improvement further comprises first and second thermally activated restraining members.

4. A valve comprising:

a valve housing having an inlet, an outlet and a passageway therebetween, an inlet end of the valve housing being configured for connection to a pressure vessel;

a passageway seal located adjacent to the inlet of the valve housing;

a hollow bayonet tube located within the valve housing and movable between a first position spaced from the passageway seal and a second position through the passageway seal and at least partially within the passageway adjacent to the inlet, the hollow bayonet tube having a tubular wall, a cutting end comprising a leading edge and a trailing edge, an opposite end and a flow path therebetween, the tubular wall being configured to define an opening adjacent to the leading edge, wherein the opening is generally vertically aligned with the trailing edge, the cutting end of the bayonet tube being sized relative to the passageway adjacent to the inlet end to take in substantially all of the passageway seal in the flow path past the opening when the passageway seal is punctured due to placement of the bayonet tube in the second position.

* * * * *

UNITED STATES PATENT AND TRADEMARK OFFICE
CERTIFICATE OF CORRECTION

PATENT NO. : 5,647,390
DATED : JULY 15, 1997
INVENTOR(S) : LLOYD G. WASS

It is certified that error appears in the above-indentified patent and that said Letters Patent is hereby corrected as shown below:

Col. 3, line 47, delete "themally", insert --thermally--

Col. 5, line 14, delete "cuffing", insert --cutting--

Col. 6, line 49, delete "diameteters", insert --diameters--

Col. 6, line 51, delete "56e", insert --56--

Signed and Sealed this

Twenty-third Day of December, 1997

Attest:

Attesting Officer

BRUCE LEHMAN

Commissioner of Patents and Trademarks